United States Patent
Tietze et al.

(10) Patent No.: US 11,313,502 B2
(45) Date of Patent: Apr. 26, 2022

(54) HOSE COUPLING

(71) Applicant: Vestas Wind Systems A/S, Aarhus N. (DK)

(72) Inventors: Poul T. Tietze, Brabrand (DK); Tommy Eschelund, Tjele (DK)

(73) Assignee: Vestas Wind Systems A/S, Aarhus N (DK)

( * ) Notice: Subject to any disclaimer, the term of this patent is extended or adjusted under 35 U.S.C. 154(b) by 196 days.

(21) Appl. No.: 16/462,351

(22) PCT Filed: Dec. 6, 2017

(86) PCT No.: PCT/DK2017/050409
§ 371 (c)(1),
(2) Date: May 20, 2019

(87) PCT Pub. No.: WO2018/103804
PCT Pub. Date: Jun. 14, 2018

(65) Prior Publication Data
US 2019/0285213 A1 Sep. 19, 2019

(30) Foreign Application Priority Data
Dec. 6, 2017 (DK) .......................... PA 2016 70969

(51) Int. Cl.
*F16L 33/26* (2006.01)
*F16L 25/00* (2006.01)

(52) U.S. Cl.
CPC ............ *F16L 33/26* (2013.01); *F16L 25/0036* (2013.01)

(58) Field of Classification Search
CPC ..... F16L 33/26; F16L 25/0036; F16L 51/025; F16L 51/028; F16L 27/0857; F16L 51/02;
(Continued)

(56) References Cited

U.S. PATENT DOCUMENTS 3,731,711 A * 5/1973 Bauer
4,929,002 A * 5/1990 Sauer .................... F16L 33/213
(Continued)

FOREIGN PATENT DOCUMENTS

AT          8709 B     11/2006
CN       2108839 U      7/1992
(Continued)

OTHER PUBLICATIONS

China National Intellectual Property Administration, First Notification of Office Action in CN Application No. 201780074088.3, dated Apr. 26, 2020.
(Continued)

*Primary Examiner* — Zachary T Dragicevich
*Assistant Examiner* — William S. Choi
(74) *Attorney, Agent, or Firm* — Wood Herron & Evans LLP

(57) ABSTRACT

A pipe coupling includes a pipe branch, a hose, and a retainer. The pipe branch forms a proximal branch section, a distal branch section, and an expanded section with an increased diameter therebetween. The hose includes an opening that receives the proximal branch section and includes a proximal fold, a distal fold, and a gasket therebetween. The gasket is arranged to seal between the hose and the proximal branch section. The retainer is configured to enclose the pipe branch and the hose and forms a proximal flange and a distal flange. The proximal flange and the distal flange both extend inwardly and define a passage for the pipe branch, the passage having a diameter which is smaller than the increased diameter. The proximal flange engages the proximal fold and the distal flange engages the distal branch section. The pipe coupling provides an easy and reliable connection between vibrating machine components.

14 Claims, 2 Drawing Sheets

(58) Field of Classification Search
CPC ........ F16L 27/108; F16L 27/111; F16L 27/11;
F16L 21/06; F16L 27/1133; F16L 17/04;
F16L 19/041; F16L 33/213; F16L 33/20;
F16L 33/24; F16L 25/14; F16L 33/227
USPC ............. 285/369, 226, 145.5, 227, 903, 299
See application file for complete search history.

(56) References Cited

U.S. PATENT DOCUMENTS

| | | | | |
|---|---|---|---|---|
| 5,209,527 | A | * | 5/1993 | Hohmann ................ F16L 33/20 |
| 9,273,810 | B1 | * | 3/2016 | Martin .................. F16L 51/025 |
| 2002/0017787 | A1 | * | 2/2002 | Sakazaki ....................... 285/226 |

FOREIGN PATENT DOCUMENTS

| | | | | |
|---|---|---|---|---|
| CN | 101563563 | A | 10/2009 | |
| CN | 201836587 | U | 5/2011 | |
| CN | 201858454 | U | 6/2011 | |
| CN | 102171450 | A | 8/2011 | |
| CN | 205155438 | U | 4/2016 | |
| DE | 29519221 | U1 | 1/1996 | |
| DE | 102004015058 | A1 | 10/2005 | |
| EP | 1223375 | A1 | 7/2002 | |
| EP | 2995841 | A1 | 3/2016 | |
| EP | 3215779 | B1 * | 9/2018 | ............ F16L 33/227 |
| EP | 3369979 | B1 * | 3/2020 | ............. F16L 17/04 |
| JP | 4881188 | B2 * | 2/2012 | |
| NL | 7901276 | A | 8/1980 | |

OTHER PUBLICATIONS

Danish Patent and Trademark Office, Search and Examination Report in PA 2016 70969, dated May 3, 2017.

European Patent Office, International Search Report and Written Opinion in PCT/DK2017/050409, dated Mar. 2, 2018.

* cited by examiner

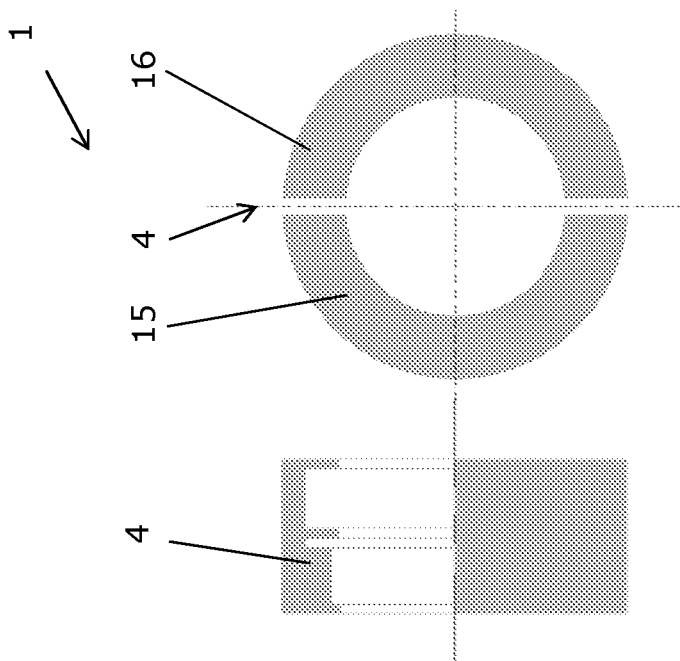
Fig. 3a
Fig. 3b
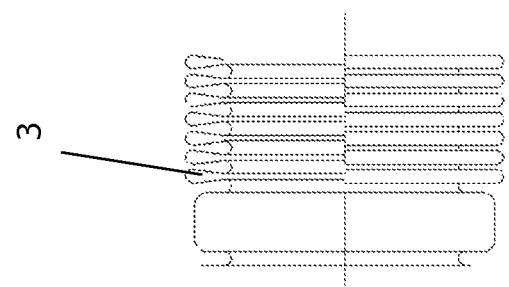
Fig. 4
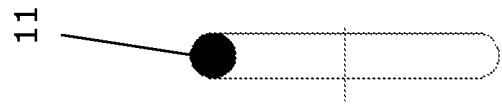
Fig. 5
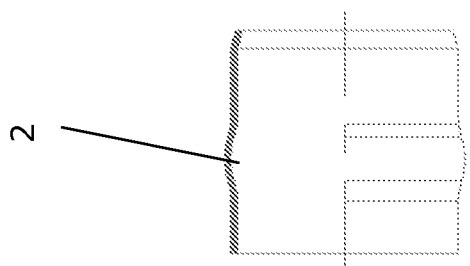
Fig. 6

HOSE COUPLING

The hose coupling comprises a pipe branch and a hose which is fitted onto the pipe branch.

Such couplings may be used e.g. for establishing liquid tight connection between a machine and peripheral equipment, e.g. in connection with liquid cooling of machines or electronic equipment.

AT 008709 U1 disclose a hose coupling.

Hose couplings exist e.g. where flexible hoses connect moving or vibrating devices to fixed surroundings. In one example, couplings are used for connecting a gearbox, a generator, or other mechanical equipment with lubrication or cooling systems, or for connecting electronic equipment with cooling systems.

Simple hose couplings exist, but they do not always offer the best fitting of the hose on the branch, and sometimes, the risk of leakage is high. More sophisticated systems exist for improving the safety and durability. Often, however, such systems include a complicated and expensive structure with mechanically interacting features of the hose and the pipe branch.

It is an object to provide a simple, reliable and durable system allowing fast and easy assembling of a hose on a pipe branch.

In accordance with the invention, the hose coupling comprises a pipe branch, a hose, and a retainer. The pipe branch forms a proximal branch section terminating the pipe branch, a distal branch section in extension to the proximal branch section, and an expanded section with an increased diameter between the proximal branch section and the distal branch section. The hose terminates axially in an opening configured to receive the proximal branch section in an axial direction and comprises a proximal fold, a distal fold, and an internal gasket between the proximal fold and the distal fold, the gasket being arranged to seal between an inner surface of the hose and an outer surface of the proximal branch section.

The retainer is configured to enclose the pipe branch and the hose and forming a proximal flange and a distal flange. Both the proximal flange and the distal flange extend inwardly and define a passage for the pipe branch.

The passage has an internal diameter which is smaller than the increased diameter, and the proximal flange is configured for engaging the proximal fold and the distal flange is configured for engaging the distal branch section.

Since the retainer engages the folds and the distal branch section, the hose can be fixed on the pipe branch in a very simple and efficient manner. The opening of the hose protects the retainer from fluids flowing in the hose, and the assembly becomes very simple due to the integration of the gasket between the folds in the opening.

In use, the pipe branch is inserted into the opening of the hose and positioned such that the expanded section is adjacent the distal fold, e.g. until the distal fold abuts the expanded section. In this position, the gasket between the proximal and distal folds seals against the outer surface of the proximal branch section and the inner surface of the hose. The retainer is attached such that it covers a part of the distal branch section and a part of the hose. More specifically, at least that part of the hose being between the proximal fold and the distal fold. In this position, the proximal flange engages the proximal fold and the distal flange engages the distal fold.

Particularly, the pipe branch may form a connection branch of a machine component, e.g. a vibrating machine component. It may e.g. form a connection branch of a cooling system for a wind turbine, e.g. for cooling the generator, gearbox, or for cooling electronic components.

The pipe branch comprises a proximal section and a distal section separated by an expanded section. The pipe branch may have a circular cross sectional shape.

The proximal and distal sections may have different diameter, or they may have the same diameter.

The expanded section has a larger diameter than the proximal and distal sections. It may e.g. have a diameter in the range of 105-110 percent of the diameter of the largest one of the proximal and distal sections. If the expanded section is not circular, it has a cross section forming a dimension in at least one direction, which dimension is larger than the largest dimension in a cross section of the proximal and distal sections. In that way, the expanded section may e.g. be a circumferentially extending projection, or it may be constituted by one or more projections formed locally at different locations along the periphery of the pipe branch, e.g. symmetrically about the periphery.

The hose may e.g. be a bellow shaped hose, e.g. a metal hose, e.g. made from steel or aluminium etc., and it may be suitable for temperatures e.g. in the range of minus 40 to plus 70 centigrade. Such hoses are generally recognised for their ability to connect a vibrating component with a fixed component or for connecting two vibrating components. At the opening, the hose is provided with the proximal and distal folds.

The proximal and distal folds may have the same radial size or different radial size. By radial size is meant that the longest distance from a centre line extending in the axial direction to the bottom of the fold could be the same or different. Correspondingly, the proximal and distal folds may have the same axial size or they may have different axial size. By axial size is meant that the longest distance from one side of the fold in the axial direction to the other side of the fold could be the same or could be different for the proximal and distal folds.

The distance between the proximal and the distal fold in the axial direction may e.g. be in the range of 3-6 times the size of the largest one of the proximal and the distal fold in the axial direction.

The retainer may further be configured with a retention flange extending inwardly. The retention flange may define a passage with an internal diameter having a diameter which is smaller than the increased diameter, and the retention flange may be configured to engage the distal fold externally.

The retention flange and the proximal flange may define passages with the same internal diameter to thereby fit a pipe branch with a cylindrical shape and constant diameter of the proximal branch section.

At least one of the proximal fold and the distal fold may define an inner surfaces configured for contact with the outer surface of the proximal branch section. By the contact between the inner surfaces of the folds and the outer surface of the proximal branch section, an increased stiffness and higher strength can be obtained. By contact between the inner surface of both folds, bending or change of angle of the hose relative to the pipe branch can be prevented.

The retainer may be configured for applying a pressure to the proximal branch section through the hose. The pressure can provide an increased bonding of the hose onto the pipe branch, and it may further reduce risk of leakage between the pipe branch and the hose. The retainer may e.g. be elastically deformable such that the pressure can be applied by elastic deformation of the retainer. In one embodiment, at least one of the proximal and distal flange is made from a material which is more elastically deformable than the remaining part of the retainer. By more elastically deformable is herein meant that it deforms more upon application of a pressure and therefore has increased capability of applying pressure to the hose by its elasticity. In one example the retainer is made from a rigid metal or plastic material and comprises flanges of a less rigid metal or plastic or rubber material.

The hose could be configured with a bellow section, or the entire hose could be a bellow hose enabling a more flexible hose and improved ability to resist vibration or movement between the opposite ends of the hose. The bellow section may e.g. be directly against the proximal fold. In one embodiment, the proximal fold is constituted by the last fold of the bellow section, and in one embodiment, this last fold is reshaped relative to the folds of the bellow section. In one embodiment, the entire hose is formed by the bellow section.

A distance between adjacent folds in the bellow section may be smaller than the distance between the proximal fold and the distal fold. This will leave more space for the gasket between the proximal and distal fold than between the folds of the bellow. This feature thereby provides the combination between large flexibility due to a large number of folds in the bellow section and good sealing capability due to a large gasket between the proximal and distal folds.

At least one of the proximal, distal or retention flanges extends circumferentially along an inner surface of the retainer, e.g. forming an unbroken line circumferentially about the hose. This may provide an even pressure circumferentially about the hose and thereby improve the sealing between the hose and the pipe branch.

The retainer may comprise a first clamp part and a second clamp part, the first and second clamp parts being configured substantially encircle the pipe branch and the hose, and wherein the first and second clamp part is mated in a direction with a radial component in relation to the pipe branch. The retainer may e.g. be made from 2, 3, 4, 5, 6 or more separate parts. Particularly, the retainer may be made by assembling two parts joining each other in a plane extending axially, i.e. split plane being parallel to the longitudinal axis of the hose/pipe. The parts forming the retainer may be assembled by traditional assembly elements such as rivets, bolts or hose clamps, or the parts may be geometrically interlocked.

In embodiments the retainer is formed with attachment means configured for attachment of the coupling to a support means. For example the retainer may have apertures allowing a band to be inserted and clamping the coupling to the support means or the retainer may have bolt holes for attachment to the support means by bolts.

The pipe branch and the hose could be made of electrically conductive materials to thereby enable conduction of an electrical current between the pipe branch and the hose. This may e.g. enable connection of electrical equipment to ground (earthed connection for equal reference point) via the hose and pipe branch connection, or transmission of data signals via the connection between the pipe branch and hose.

The retainer could be less flexible than the opening. Herein, this means that the ability of the retainer to deform elastically is lower than that of the opening. In this context the opening comprises the proximal and the distal fold, thus in this embodiment the hose in the vicinity of the proximal and distal fold will be more inclined to deform elastically than the retainer. This will improve the ability of the retainer to apply pressure onto the pipe branch through the hose, and therefore improve the sealing capabilities.

The pipe branch could be less flexible than the opening. Herein, this means that the ability of the pipe branch to deform elastically is lower than that of the opening. In this context the opening comprises the proximal and the distal fold, thus in this embodiment the hose in the vicinity of the proximal and distal fold will be more inclined to deform elastically than the pipe branch. This will improve the ability of the hose to be shaped to match the shape of the pipe branch under pressure applied by the retainer. Accordingly, an improved sealing and better fixation can be obtained.

The two aforementioned embodiments can be combined such that both the retainer and the pipe branch is less flexible than the opening.

In a second aspect, the invention provides a retainer for a pipe coupling according to the first aspect of the invention, particularly a retainer configured to enclose the pipe branch and the hose and forming a proximal flange and a distal flange, the proximal flange and the distal flange both extending inwardly and defining a passage for the pipe branch, the passage having an internal diameter which is smaller than the increased diameter, the proximal flange being configured for engaging the proximal fold and the distal flange being configured for engaging the distal branch section.

The retainer according to the second aspect may include any of the features mentioned relative to the retainer of the pipe coupling according to the first aspect.

In a third aspect, the invention provides a hose for a hose coupling according to the first aspect of the invention. Particularly, the hose may terminate axially in an opening configured to receive the proximal branch section in an axial direction and comprising a proximal fold, a distal fold, and an internal gasket between the proximal fold and the distal fold, the gasket being arranged to seal between an inner surface of the hose and an outer surface of the proximal branch section.

The hose according to the third aspect may include any of the features mentioned relative to the hose of the pipe coupling according to the first aspect.

In a fourth aspect, the invention provides a wind turbine comprising a coupling according to the first aspect of the invention.

The wind turbine according to the fourth aspect may include any of the features mentioned relative to the pipe coupling according to the first aspect.

BRIEF DESCRIPTION OF DRAWINGS

The invention will now be described by way of example with reference to following figures in which:

FIGS. 3-6 illustrate the individual components of the pipe coupling.

DESCRIPTION OF AN EMBODIMENT

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

Figure 1:
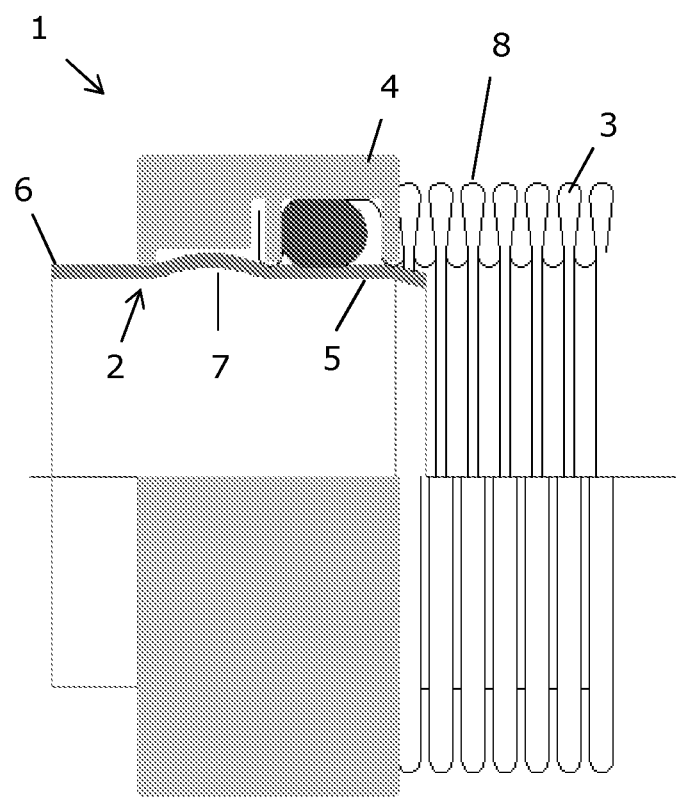
FIG. 1 illustrates a partial cross section of a pipe coupling according to the invention.

FIG. 1 illustrates a pipe coupling 1 according to the invention. The pipe coupling comprises three main components, namely the pipe branch 2, the hose 3 and the retainer 4. The pipe branch 2 may e.g. form part of a machine component and it may e.g. constitute an inlet or outlet for a cooling circuit in which a cooling fluid is circulated. The hose 3 may connect the machine component e.g. to a radiator or condenser of the cooling circuit.

In one embodiment, the machine component is housed in a nacelle or tower of a wind turbine and the hose connects the pipe branch 2 of the machine component with a cooling arrangement on the roof of the nacelle.

The retainer 4 is attachable on the pipe branch 2 and the hose 3 and fixes the position of the hose 3 on the pipe branch 2.

The pipe branch 2 has a proximal branch section 5 which forms an end which terminate the pipe branch 2. The pipe branch 2 further has a distal branch section 6 forming an extension to the proximal branch section 5—i.e. arranged coaxially.

The pipe branch 2 further forms an expanded section 7 where the diameter is increased relative to the diameter of the proximal branch section 5 and the distal branch section 6. The expanded section 7 may e.g. be formed by a radial outward deformation of a section of the pipe branch 2. The expanded section 7 may particularly extend unbroken along the entire circumference of the pipe branch 2.

The hose 3 terminates axially in an end forming an opening which is sized and shaped to receive the proximal branch section 5. The proximal branch section 5 can be pushed axial into the opening until the axial end of the hose 3 reaches the expanded section 7 of the pipe branch 2. At this point, further insertion of the pipe branch 2 is prevented by contact between an inner surface of the hose 3 and the outer surface of the expanded section 7.

Figure 2:
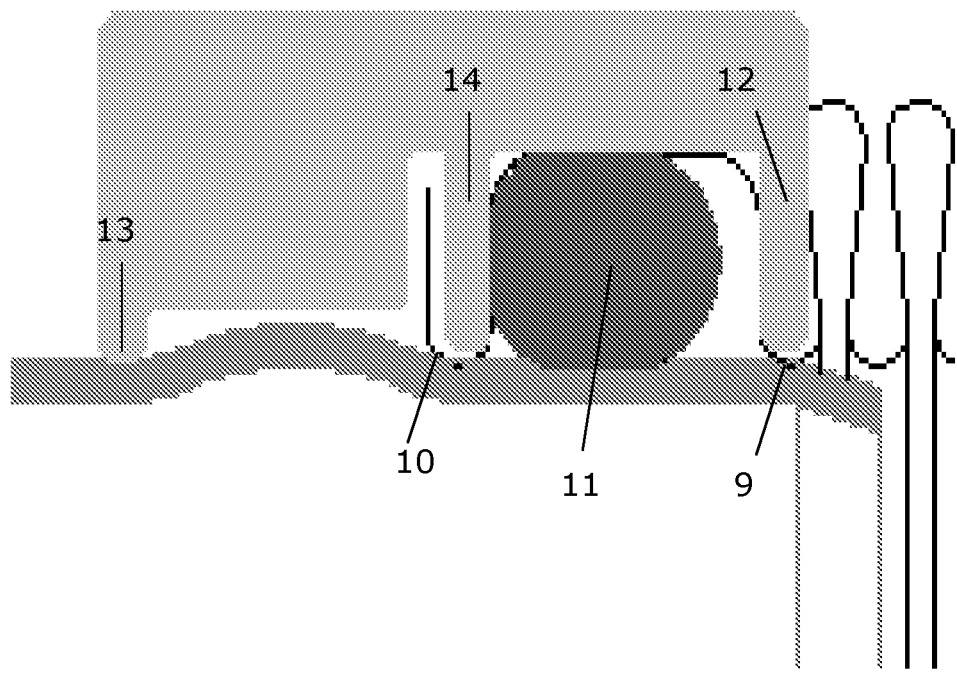
FIG. 2 illustrates an enlarged view of the cross section of the pipe coupling.

FIGS. 1 and 2 illustrate the pipe coupling in a configuration where the pipe branch 2 is inserted fully into the hose 3 and the retainer 4 is attached for final fixing of the hose 3 to the pipe branch 2.

The hose 3 is bellowed which means that it comprises a plurality of folds 8. A proximal one of the folds 9 and a distal one of the folds 10 are separated by an increased spacing in which an internal gasket 11 is seated. The proximal and distal folds 9, 10 and the increased spacing is made by deformation of the end of a bevelled hose 3, i.e. by deformation of the hose into forming the two folds 9, 10.

The gasket 11 has a dimension which is slightly smaller than the spacing between the proximal and distal folds 9, 10. The gasket 11 is made from a resilient material such as soft rubber, e.g. EPDM rubber or made from silicone etc. The gasket 11 is compressed in the space and therefore provides efficient sealing between the hose 3 and the pipe branch 2.

The retainer 4 is made from two separate components—a first clamp part 15 and a second clamp part 16 which are assembled about the pipe branch 2. The first and second clamp part 15, 16 are joined along a surface which extends in the axial direction. The retainer 4 is arranged such that it encloses both a part of the pipe branch 2 and a part of the hose 3.

The retainer 4 engages at least one of the folds of the hose 3, preferably the proximal fold 9 and it further engages the pipe branch 2 at a location on the distal branch section 6. Particularly, it comprises a proximal flange 12 and a distal flange 13.

The proximal flange 12 and the distal flange 13 both extending inwardly and each defines a passage for the pipe branch 2. These two passages have internal diameters which are smaller than the increased diameter of the expanded section 7. The shape, size, and distance between these two flanges thereby enable the arrangement of the proximal flange 12 in the proximal fold 9 and distal flange 13 at the distal branch section 6. In this position, the retainer 4 is fixed relative to the hose 3 by the engagement of the proximal flange 12 in the proximal fold 9, and the dimension of the expanded section 7 relative to the distal flange 13 prevents the retainer 4 from sliding axially along the pipe branch 2. Accordingly, the retainer 4 efficiently locks the hose 3 on the pipe branch 2.

The disclosed pipe coupling 1 comprises an additional flange on the retainer 4. Herein, this flange is referred to as a retention flange 14. The retention flange 14 extends inwardly and matches the shape and location of the distal fold 10 such that it engages the distal fold 10 externally. This provides improved fixation of the retainer 4 in the hose 3 and thus an increased strength of the pipe coupling 1.

FIGS. 3a and 3b illustrates a plan view and a cross section of a retainer 4 for the hose coupling 1 shown in FIGS. 1 and 2, FIG. 4 illustrates the hose 3 of the hose coupling 1 in FIGS. 1 and 2, FIG. 5 illustrates a cross section of a gasket 11 for the hose coupling 1 shown in FIGS. 1 and 2, and FIG. 6 illustrates a pipe branch 2 for the hose coupling 1 shown in FIGS. 1 and 2.

The invention claimed is:

1. A pipe coupling comprising:
   a pipe branch,
   a hose, and
   a retainer,
   wherein the pipe branch forms a proximal branch section terminating the pipe branch, a distal branch section in extension to the proximal branch section, and an expanded section between the proximal branch section and the distal branch section, the expanded section having an increased external diameter relative to the external diameter of the proximal branch section and the distal branch section,
   wherein the hose terminates axially in an opening configured to receive the proximal branch section in an axial direction and comprises a proximal fold, a distal fold, and an internal gasket between the proximal fold and the distal fold, the gasket being arranged to seal between an inner surface of the hose and an outer surface of the proximal branch section, and the gasket having an external diameter greater than the increased external diameter,
   wherein the retainer is configured to enclose the pipe branch and the hose and forms a proximal flange and a distal flange, the proximal flange and the distal flange both extending inwardly and defining a passage for the pipe branch, the passage having an internal diameter which is smaller than the increased external diameter, the proximal flange being configured for engaging the proximal fold, and the distal flange being configured for engaging the distal branch section, and
   wherein the retainer is configured with a retention flange extending inwardly and defining a passage with an internal diameter smaller than the increased external diameter, the retention flange being configured to engage the distal fold externally.

2. The coupling according to claim 1, wherein the retention flange and the proximal flange define passages with the same internal diameter.

3. The coupling according to claim 1, wherein the proximal fold and the distal fold define inner surfaces configured for contact with the outer surface of the proximal branch section.

4. The coupling according to claim 1, where the retainer is configured for applying a pressure to the proximal branch section through the hose.

5. The coupling according to claim 1, wherein the hose is configured with a bellow section.

6. The coupling according to claim 5, wherein the bellow is shaped with a distance between adjacent folds which is smaller than the distance between the proximal fold and the distal fold.

7. The coupling according to claim 1, wherein at least one of the proximal, distal or retention flange extends circumferentially along an inner surface of the retainer.

8. The coupling according to claim 1, wherein the retainer comprises a first clamp part and a second clamp part, the first and second clamp parts being configured to substantially encircle the pipe branch and the hose, and wherein the first and second clamp part is mated in a direction with a radial component in relation to the pipe branch.

9. The coupling according to claim 1, wherein the pipe branch and the hose is made of electrically conductive materials.

10. The coupling according to claim 1, wherein the retainer is less flexible than the proximal branch section.

11. The coupling according to claim 1, wherein the pipe branch is less flexible than the opening.

12. The coupling according to claim 1, wherein the external diameter of the gasket is greater than the internal diameter defined by the proximal flange.

13. The coupling according to claim 1, wherein the external diameter of the gasket is greater than the internal diameter defined by the distal flange.

14. The coupling according to claim 1, wherein the external diameter of the gasket is greater than the internal diameter defined by the retention flange.

* * * * *